United States Patent Office 3,829,524
Patented Aug. 13, 1974

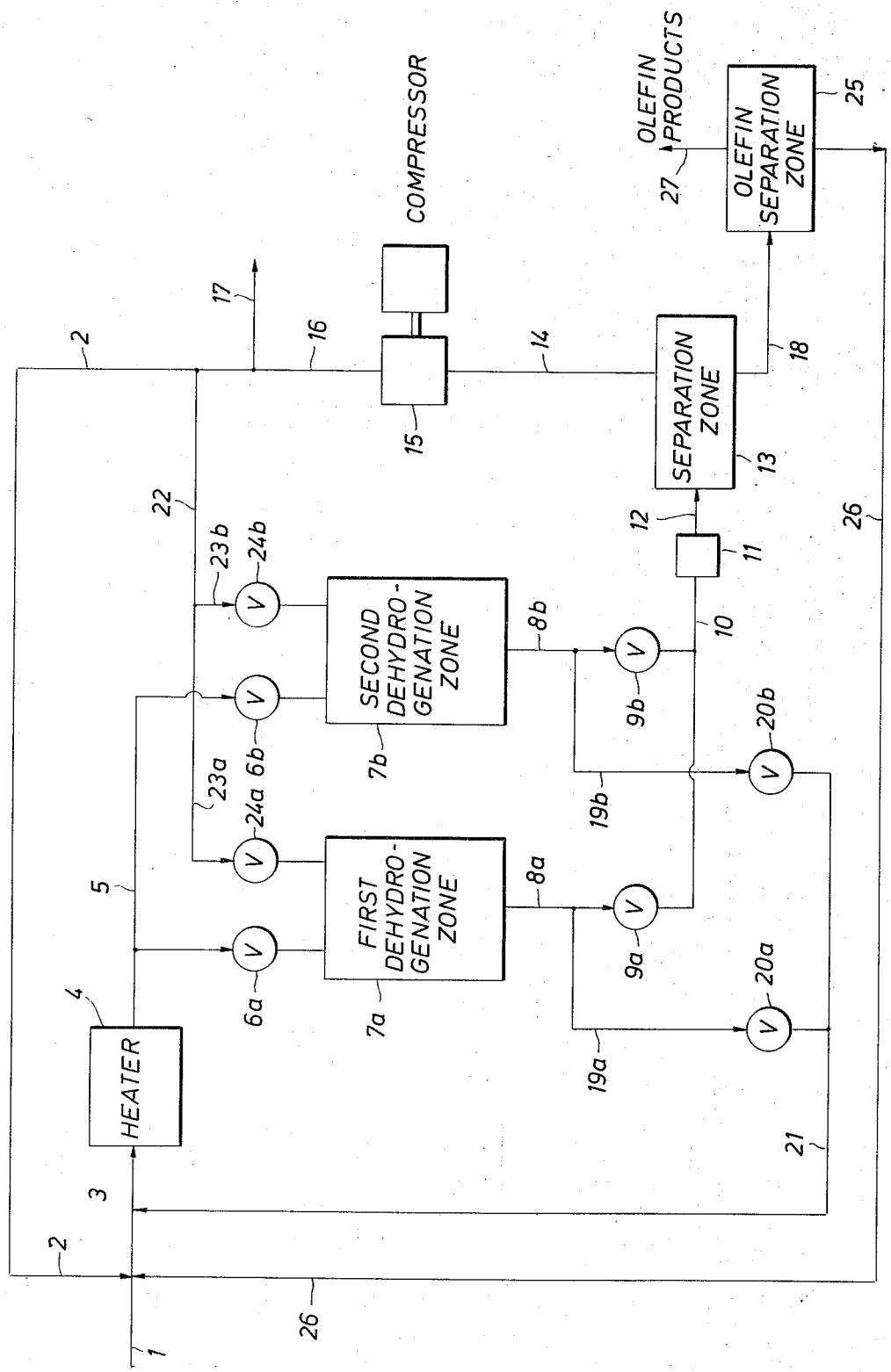

3,829,524
DEHYDROGENATION PROCESS FOR CONVERTING n-PARAFFIN HYDROCARBON INTO n-OLEFIN HYDROCARBON
Charles A. Senn III, Greenville, S.C., and Levi C. Parker, Port Arthur, Tex., assignors to Texaco Inc., New York, N.Y.
Continuation-in-part of application Ser. No. 213,558, Dec. 29, 1971. This application July 11, 1973, Ser. No. 378,298
Int. Cl. C07c 3/28, 5/18
U.S. Cl. 260—683.3   9 Claims

ABSTRACT OF THE DISCLOSURE

A dehydrogenation process wherein n-paraffin hydrocarbon at an elevated temperature, in the presence of molecular hydrogen is contacted with a dehydrogenation catalyst comprising a dehydrogenation component supported upon an inorganic metal oxide base to convert said n-paraffin hydrocarbon into n-olefin hydrocarbon. Such process incorporates an improvement for increasing the selectivity of said catalyst for converting n-paraffin hydrocarbon into n-olefin hydrocarbon, which improvement comprises treating a fresh or freshly regenerated dehydrogenation catalyst, prior to use in the dehydrogenation reaction, with paraffin hydrocarbon and hydrogen in a mole ratio of hydrogen to hydrocarbon of from about 0.5:1 to about 40:1, at a temperature of from about 750° F. to about 1000° F., and a pressure of from about atmospheric to about 50 p.s.i.g. for a period of from about 12 to about 24 hours.

The present application is a continuation-in-part of application Ser. No. 213,558, filed Dec. 29, 1971.

BACKGROUND OF THE INVENTION

Field of the Invention

The present invention relates to the catalytic dehydrogenation of hydrocarbons. More particularly, the invention relates to the catalytic dehydrogenation of normal paraffin hydrocarbons into normal olefinic hydrocarbons.

Prior Art

Catalytic processes for the dehydrogenation of paraffin hydrocarbons into olefin hydrocarbons are well known in the prior art. In such processes, hydrogen is split from the paraffin hydrocarbons in the presence of suitable catalysts at elevated temperatures to yield olefin hydrocarbons. Olefin hydrocarbons obtained from the dehydrogenation of paraffin hydrocarbons are useful in a wide variety of industries including the petrochemical, petroleum, pharmaceutical, plastics industry, etc. Straight chain olefin hydrocarbons in the range $C_{10}$–$C_{20}$, which are derived from the dehydrogenation of normal paraffin hydrocarbons of a similar carbon number range, are particularly useful as reactants in the production of alkyl-aromatic hydrocarbons suitable for use in detergents.

Charge stocks for such dehydrogenation processes are selected from hydrocarbon oils and petroleum fractions which contain substantial amounts of paraffin hydrocarbons. Preferably, the paraffin hydrocarbons are normal paraffins which may be dehydrogenated into straight chain olefin hydrocarbons. Petroleum fractions containing substantial amounts of normal paraffin hydrocarbons include primary flash distillates, naphthas, kerosine, diesel fuel, furnace oil, and other petroleum distillate fractions containing the desired molecule weight range paraffin hydrocarbons. It is known to treat such petroleum fractions to separate from them normal paraffinic fractions which are particularly suitable as charge stocks to the dehydrogenation processes described herein. For example, a hydrocarbon fraction comprising normal paraffin hydrocarbons may be obtained by treating a hydrocarbon stream with synthetic crystalline molecular sieves having uniform pore openings of about 5 angstrom units to adsorb normal paraffin hydrocarbons from such stream, then treating the molecular sieves to desorb the normal paraffin hydrocarbons therefrom. Such adsorption-desorption processes are well known and widely practiced in the refining of petroleum. Normal paraffin hydrocarbons produced by other than the distillation and/or adsorption of petroleum fractions are also useful as charge stock to the dehydrogenation processes described herein. For example, n-paraffin hydrocarbons produced by such means as the Fischer-Tropsch process may be employed as charge stock herein.

Preferably, the paraffin hydrocarbons selected as charge stock for a dehydrogenation process are normal paraffin hydrocarbons in the carbon number range of from about $C_7$–$C_{20}$. The n-paraffin hydrocarbon charge may comprise one n-paraffin hydrocarbon or a mixture thereof, such as $C_{10}$–$C_{14}$ normal paraffins, $C_{12}$–$C_{13}$ normal paraffins and $C_{12}$–$C_{20}$ normal paraffins, selected to yield the desired olefin hydrocarbons.

Reaction temperatures for the catalytic dehydrogenation of normal paraffin hydrocarbons may range from about 600° F. to about 1,000° F., preferably from about 850° F. to about 950° F. Since the dehydrogenation reaction is endothermic, heat must be continually added to the reaction in order to maintain the reaction. Such heat is generally supplied by preheating the dehydrogenation reaction charge to a temperature sufficient to maintain the desired temperature in the dehydrogenation zone. Such preheat may be obtained by heat exchange between reaction effluent and reaction charge and by heating reaction charge in a heating means such as an oil or gas fired heater.

Moderate reaction pressures are employed for the dehydrogenation of normal paraffin hydrocarbons into n-olefin hydrocarbons. Pressures from subatmospheric to about 50 p.s.i.g. may be employed. Pressures in the range of from about 15 p.s.i.g. to about 50 p.s.i.g. are preferred. Pressures much below atmospheric are difficult to maintain because of mechanical limitations and the presence of hydrogen and light hydrocarbons in the reaction zone. Increased pressures, particularly above about 50 p.s.i.g. tend to retard the dehydrogenation of paraffins into olefins.

Contact time between the normal paraffin hydrocarbon reactants and the dehydrogenation catalyst is generally maintained at a relatively short time period. Liquid hourly space velocities (LHSV) of from about 0.1 to about 10 volumes of oil per volume of catalyst per hour (vo./vc./hr.) may be employed. Preferably the LHSV is maintained in the range of from about 1.0–6.0 vo./vc./hr. When the reactant hydrocarbons are maintained in the presence of the dehydrogenation catalyst for extended periods, unwanted side reactions tend to increase. Side reactions such as polymerization of olefinic hydrocarbons, deposition of coke upon the catalyst, cracking of paraffinic hydrocarbons into low molecular weight hydrocarbons, etc. increase as the contact time between the reactant hydrocarbons and the catalysts is increased.

Commonly, excess molecular hydrogen is supplied along with the reactant normal paraffin hydrocarbons to the dehydrogenation zone. Such excess hydrogen tends to reduce the rate of coke deposition upon the catalyst. Since the dehydrogenation reaction produces hydrogen, a portion of the hydrogen separated from the dehydrogenation zone effluent may be recycled for admixture with additional normal paraffin hydrocarbon charge to maintain the desired hydrogen to hydrocarbon ratio in the dehydrogenation zone. Excess hydrogen produced in the dehydrogenation zone may be recovered for use as fuel or in other refinery processes, or it may be vented to a flare for disposal. Mole ratios of hydrogen to hydrocarbon in the range of from about 0.5:1 to about 40:1 may be employed. Preferably, hydrogen to hydrocarbon mole ratios in the range of from about 2:1 to about 15:1 are employed. At hydrogen to hydrocarbon mole ratios below about 2:1, the rate of coke deposition upon the catalyst may be excessive, leading to a short catalyst life. Mole ratios of hydrogen to hydrocarbon above about 15:1 do not add a significant advantage, and are therefore not usually employed.

Any suitable catalysts for dehydrogenation of normal paraffin hydrocarbons into normal olefin hydrocarbons may be employed in this process. Such dehydrogenation catalysts comprise a dehydrogenation component supported upon a refractory metal oxide base. The dehydrogenation component comprises a metal or mixture of metals having dehydrogenation activity, for example, platinum, palladium, ruthenium, rhodium, rhenium, and mixtures thereof, may be employed as the dehydrogenation component. The dehydrogenation component is preferably present in the range of about 0.01–5 weight percent of the dehydrogenation catalyst.

The refractory metal oxide base may be selected from such oxides as silica, alumina, silica-alumina, silica-boria, silica-zirconia, silica-magnesia, etc. One effective metal oxide base is one characterized by its catalytic cracking activity, such as for example, a silica-alumina cracking catalyst containing alumina in the range of about 7–30 weight percent, preferably in the range of 12–25 weight percent. Such cracking bases may be effectively treated to alter their activity and thereby improve their effectiveness as a dehydrogenation catalyst by such means as treating with steam at a temperature of from about 900–1400° F. for a time sufficient to alter the cracking activity, or such as by adding from 0.1 to about 5 weight percent of an alkali metal or an alkaline earth metal. Particularly effective metal oxide bases are those designated in the literature as molecular sieves. Examples of these are the Type A (3A, 4A, 5A), Type X (10X, 13X), and Type L molecular sieve bases. The synthesis and detailed characterization of the A and X sieves are found in U.S. 2,882,243 and U.S. 3,311,190. In brief, the A sieve may be characterized by the general formula:

$$1.0 \pm 0.2 M_2/nO : Al_2O_3 : 1.85 \pm 0.5 SiO_2 : yH_2O$$

where M represents a metal, $n$ is its valence and $y$ may be any value up to 6 depending on M and the degree of crystal hydration. The general formula of the X sieve is characterized by:

$$0.9 \pm 0.2 M_2/nO : Al_2O_3 : 2.5 \pm 0.5 SiO_2 : yH_2O$$

where M is a metal, $n$ is its valence, and $y$ ranges from about 6 up to 8 depending on the identity of the metal and the degree of crystal hydration. The synthesis and detailed characterization of the L sieve is found in U.S. 3,375,206. Type L sieve has the general formula:

$$1.0 \pm 0.1 M_2/nO : Al_2O_3 : 6.4 \pm 0.5 SiO_2 : yH_2O$$

where M is at least one exchangeable cation, $n$ is the valence of M, and $y$ is from 0 to about 7.

During the course of a continuous dehydrogenation process for the conversion of normal paraffin hydrocarbons into normal olefin hydrocarbons, coke and/or other carbonaceous deposits accumulate upon the surface and within the pores of the dehydrogenation catalyst. As such accumulations increase, the activity of the catalyst to dehydrogenate the paraffin hydrocarbons decreases. After a time of continuous operation, the accumulation of carbonaceous deposits will become so great and the catalytic activity of the catalyst will be so low that it is uneconomical to continue operation of the dehydrogenation process. The catalytic activity of a dehydrogenation catalyst containing substantial carbonaceous deposits may be substantially restored by regenerating the catalyst and removing such accumulated carbonaceous deposits from the catalyst. Commonly, the carbonaceous deposits are removed and catalyst activity is regenerated by burning, under controlled conditions, in the presence of an oxygen containing gas. Such regeneration procedures are well known to those familiar with the regeneration of catalyst and need not be further described herein.

It may be convenient to employ a plurality of dehydrogenation reaction zones containing dehydrogenation catalysts, such that reaction zones are continuously available for use in the dehydrogenation process while other reaction zones are undergoing regeneration to remove carbonaceous deposits therefrom. Upon regeneration of the catalyst in a dehydrogenation reaction zone, such zone may be returned to service in the dehydrogenation process and another zone may be removed from service for regeneration.

In such dehydrogenation processes as hereinabove described, fresh or freshly regenerated dehydrogenation catalyst possesses a high activity for conversion of normal paraffin hydrocarbons when such catalyst is first put into service in the dehydrogenation process. The fresh or freshly regenerated dehydrogenation catalyst converts the normal paraffin hydrocarbons into normal olefin and aromatic hydrocarbons. However, the selectivity of such fresh or freshly regenerated catalyst for conversion of normal paraffin hydrocarbons into the desired normal olefin hydrocarbons is poor during initial operations. Therefore, the proportion of aromatic to olefinic hydrocarbons formed is relatively large for a short time after a fresh or freshly regenerated catalyst is placed in service in a dehydrogenation process. The high conversion activity declines rapidly and the selectivity for conversion of normal paraffin hydrocarbons into normal olefin hydrocarbons increases. For a time period of from about 12 to 24 hours after a fresh or freshly regenerated catalyst is placed in service in a dehydrogenation process, a substantial portion of the normal paraffin hydrocarbon charge is converted into aromatic hydrocarbons and the rate of normal paraffin hydrocarbon conversion is relatively high. During such 12 to 24 hour period, the selectivity of the dehyrogenation catalyst for converting normal paraffin hydrocarbons to normal olefin hydrocarbons improves and the conversion activity of such catalyst declines until at the end of such time period the selectivity and conversion activity of the catalyst stabilizes. From the end of such time period, the activity of the dehydrogenation catalyst slowly declines with the accumulation of coke upon the active catalyst sites until continued operation with such catalyst becomes uneconomical or otherwise undesirable because of low olefin yield, and the catalyst is removed from the dehydrogenation process for regeneration.

SUMMARY OF THE INVENTION

Now according to the method of the present invention, an improved process for the dehydrogenation of normal paraffin hydrocarbons into normal olefin hydrocarbons is presented wherein the high conversion of normal paraffin hydrocarbons into aromatic hydrocarbons is minimized for the initial time period of from about 12 to about 24 hours after a fresh or freshly regenerated dehydrogenation catalyst is placed into service in a dehydrogenation process. According to the improvement, a fresh or freshly regenerated dehydrogenation catalyst is treated to improve its selectivity for conversion of normal paraffin hydrocarbon into normal olefin hydrocarbon before such catalyst is employed in a dehydrogenation process. Also, such invention provides a method for carrying out such treatment of the dehydrogenation catalyst in connection with a continuous normal paraffin hydrocarbon dehydrogenation process. A fresh or freshly regenerated dehydrogenation catalyst is treated at a temperature of from about 750° F. to about 1000° F., a pressure of about atmospheric to about 50 p.s.i.g. with a hydrogen-hydrocarbon mixture having a molar ratio of hydrogen to hydrocarbon of about 0.5:1 to about 40:1 for a period of time sufficient to improve the selectivity of such catalysts for the conversion of normal paraffin hydrocarbons into normal olefin hydrocarbons wherein the hydrocarbon is in the $C_7$–$C_{24}$ carbon number range. Conveniently, the treating hydrocarbon is the same as the hydrocarbon charged to the dehydrogenation process. Preferably, such fresh or freshly regenerated dehydrogenation catalyst is treated by flowing a small stream of hydrocarbon and molecular hydrogen through such catalyst at a rate just sufficient to maintain contact of said hydrocarbon with said catalyst for a period of time before such catalyst is employed in a dehydrogenation process.

A preferred embodiment of the present invention comprises a continuous normal paraffin dehydrogenation process wherein a plurality of dehydrogenation zones each containing dehydrogenation catalyst are employed in such manner that at least one dehydrogenation zone is continuously employed to dehydrogenate normal paraffin hydrocarbons while at least one other dehydrogenation zone is removed from the process flow sequence for regeneration or addition of fresh catalyst, and treatment of fresh or freshly regenerated catalyst prior to returning such removed dehydrogenation zone to service in the dehydrogenation process. The preferred process for practicing the present invention, wherein a fresh or freshly regenerated dehydrogenation catalyst is treated prior to utilizing such catalyst in the dehydrogenation process, comprises: heating to a temperature of from about 860° F., to about 930° F., a normal paraffin charge stock-hydrogen mixture having a molar ratio of hydrogen to hydrocarbon of from about 2:1 to about 15:1; converting, in a first dehydrogenation zone, a portion of such normal paraffin hydrocarbon charge into normal olefin hydrocarbon at a temperature in the range of about 860° F. to about 930° F., a pressure in the range of about 15 p.s.i.g. to about 50 p.s.i.g., at a LSHV of from about 2 to 10 vo./hr./vc.; separating a first dehydrogenation zone effluent into a gaseous component comprising hydrogen and noncondensable hydrocarbons and a liquid component comprising normal olefin hydrocarbons and unreacted normal paraffin hydrocarbons; recirculating a portion of the hydrogen containing gaseous component for admixture with additional normal paraffin charge stock; recovering said liquid component for subsequent treatment to yield the desired normal olefin hydrocarbon product; treating, in a second dehydrogenation zone, fresh or freshly regenerated dehydrogenation catalyst, at a pressure of from about 15 to about 50 p.s.i.g., and a temperature of from about 860° F., to about 930° F. with a small portion of said heated normal paraffin-hydrogen mixture for a period of from about 12 to about 24 hours sufficient to substantially increase the selectivity of said fresh or freshly regenerated dehydrogenation catalyst for the conversion of normal paraffin hydrocarbons into normal olefin hydrocarbons; and subsequently, converting normal paraffin hydrocarbon charge stock into normal olefin hydrocarbon as described hereinabove in the presence of such treated dehydrogenation catalyst.

The advantage of the present improvement to a dehydrogenation process for the production of normal olefin hydrocarbons from normal paraffin hydrocarbons is that the yield of normal olefin hydrocarbons may be substantially increased over yields obtainable from methods of the prior art wherein a fresh or freshly regenerated dehydrogenation catalyst was directly employed in the dehydrogenation process without the treating step which is the improvement of the present invention. Additionally, formation of product containing high aromatics content is avoided during the first 12 to 24 hours. A fresh or freshly regenerated catalyst is employed in the dehydrogenation process.

BRIEF DESCRIPTION OF THE DRAWINGS

The attached drawing is a schematic representation of a normal paraffin dehydrogenation process for the production of normal olefin hydrocarbons which process embodies the improvement of the present invention.

DETAILED DESCRIPTION OF THE INVENTION

The improvement of the present invention, wherein a fresh or freshly regenerated dehydrogenation catalyst is treated to improve the selectivity of said catalyst for the conversion of normal paraffin hydrocarbons into normal olefin hydrocarbons prior to utilizing said fresh or freshly regenerated dehydrogenation catalyst in a normal paraffin dehydrogenation process, may be better understood by the reference to the attached drawing. The attached drawing is a schematic representation of a normal paraffin dehydrogenation process embodying the improved treating method of the present invention, and for the sake of clarity many elements, such as pumps, valves, instrumentation, etc., commonly employed in a commercial process but which are not necessary for an adequate description of the present invention have been omitted. It is to be understood that the attached drawing shows one embodiment of the present invention and that many modifications and alterations which are within the spirit and scope of the present invention will be obvious to those skilled in the art.

In the drawing, a hydrocarbon charge stock, comprising normal paraffin hydrocarbons in a carbon number range of $C_{11}$ to $C_{14}$, at a fresh feed rate of about 25 barrels per hour (b./h.) from Line 1 is combined with a recycle n-paraffin stream at a rate of about 150 b./h. (Line 26) and with a recirculating gas stream comprising molecular hydrogen from Line 2 at a rate of about 788,000 standard cubic feet per hour (s.c.f./h.) in Line 3 to provide a hydrogen-hydrocarbon mixture having a molar ratio of hydrogen to hydrocarbon of about 5:1. From Line 3 the hydrogen-hydrocarbon mixture passes into heater 4 wherein the mixture is heated to a temperature of about 900° F. From heater 4, the hot, hydrogen-hydrocarbon mixture passes into Line 5. A major portion of said hot hydrogen-hydrocarbon mixture, at a rate of about 170 b./h. of said hydrocarbon charge stock, passes from Line 5 through valve 6a into a first dehydrogenation zone 7 wherein the normal paraffin hydrocarbon is contacted with a dehydrogenation catalyst in the presence of molecular hydrogen in a molar ratio of hydrogen to hydrocarbon of about 5:1, at a temperature of about 900° F., a pressure of about 50 p.s.i.g., and a LHSV of about 4.0 vo./hr./vc. to convert about 13% by weight of said normal paraffin hydrocarbon, wherein about 82% by volume of said converted normal paraffin hydrocarbons are normal olefin hydrocarbons.

From the first dehydrogenation zone 7a reaction zone effluent passes via Line 8a through valve 9a into Line 10 into condenser 11. In condenser 11 the first dehydrogenation zone effluent is partially condensed into a gaseous fraction comprising hydrogen and a liquid fraction comprising unconverted normal paraffin hydrocarbons, olefin hydrocarbons, and other paraffin hydrocarbon conversion products. From condenser 11 condensate and uncondensed gas pass via Line 12 into separator 13 wherein the condensate is separated from the uncondensed gas. From separator 13 the uncondensed gas is recovered via Line 14 and compressed in compressor 15. From compressor 15 the compressed gas passes into Line 16 from which a portion, at a rate of about 788,000 s.c.f./h. passes into Line 2 as recirculating gas as hereinbefore described and the remainder passes into Line 17 through which said gas is yielded as a hydrogen product. The condensate fraction, comprising unconverted normal paraffin hydrocarbons, olefin hydrocarbons, and other paraffin hydrocarbon conversion products, is recovered from separator 13 via line 18 for routing to an olefin separation process (25) to separate the desired normal olefin products from the other components of the condensate fraction. The unconverted normal paraffins are recycled through Line 26 to the heater. Normal olefin product is recovered from the normal olefin separation process 25 via Line 27.

A minor portion of the heated normal paraffin-hydrogen mixture in Line 5, at a rate of about 5 b./h. of normal paraffin hydrocarbon, passes through valve 6b into a -cond dehydrogenation zone 7b containing fresh or freshly regenerated dehydrogenation catalyst wherein said heated normal paraffin-hydrogen mixture is allowed to contact said fresh or freshly regenerated catalyst at a temperature of about 900° F., a pressure of about 50 p.s.i.g., for a time period of about 12 to 24 hours to substantially improve the selectivity of said fresh or freshly regenerated dehydrogenation catalyst for the conversion or normal paraffin hydrocarbons to normal olefin hydrocarbons. In the second dehydrogenation zone, about 45 weight percent of the normal paraffin hydrocarbon is converted.

Effluent from the second dehydrogenation zone, during the treating period, comprising unreacted normal paraffin hydrocarbon, converted normal paraffin hydrocarbons, and hydrogen is recovered via Line 8b and passes through Line 19b, and valve 20b, into Line 21. From Line 21 the treating step effluent passes into Line 3 wherein it is combined with the normal paraffin-hydrogen mixture so the treating step effluent will pass through the dehydrogenation process for the subsequent recovery of normal olefin hydrocarbons therefrom. Alternatively, normal olefin hydrocarbons may be recovered from the treating step effluent from Line 8b by flowing it through valve 9b, Line 10, and Line 12 into separator 13 for subsequent olefin recovery in olefin separator 25. At the end of the treating period, valve 6b is closed to prevent flow of the hot, normal paraffin-hydrogen mixture into the second dehydrogenation zone 7b and the hydrocarbon charge rate to the process is adjusted to maintain the desired charge to the first dehydrogenation zone 7a. Hydrogen recycle gas from Line 16 passes at a rate of about 25,000 s.c.f./h. through Line 22, Line 23b, and valve 24b, into the second dehydrogenation zone to purge liquid hydrocarbon from the treated dehydrogenation catalyst. Purge effluent from the second desorption zone 7b passes through Line 8b, Line 19b, and valve 20b into Line 21 from which the purge effluent passes into Line 3 for admixture with the normal paraffin charge-recycle hydrogen stream. Hydrogen purge is maintained through the treated dehydrogenation catalyst in the second dehydrogenation zone 7b for a period of about 48–60 hours to remove liquid hydrocarbon from the surface of the treated dehydrogenation catalyst. At the end of the purge step, valve 24b and valve 20b are closed and the second dehydrogenation zone 7b containing treated dehydrogenation catalyst with an improved selectivity for the conversion of normal paraffin hydrocarbon into normal olefin hydrocarbon is ready for utilization in the dehydrogenation process. Said second dehydrogenation zone 7b containing treated dehydrogenation catalyst may be maintained in this condition until it is desirable to regenerate the catalyst contained in the first dehydrogenation zone 7a which is being employed in the dehydrogenation process. At such time, flow of hot, normal paraffin hydrocarbon-hydrogen mixture may be routed through the second dehydrogenation zone to convert the normal paraffin hydrocarbon into normal olefin hydrocarbon according to the process as hereinabove described, and the first dehydrogenation zone 7a may be removed from the process for regeneration of the dehydrogenation catalyst contained therein. Upon completion of the regeneration of the catalyst contained in the first dehydrogenation zone 7a, said freshly regenerated catalyst may be treated in a manner identical to the treating method described hereinabove to improve the selectivity of said freshly regenerated catalyst for the conversion of normal paraffin hydrocarbons into normal olefin hydrocarbons such that the freshly regenerated catalyst of the first dehydrogenation zone 7a will then be in condition for utilization in the dehydrogenation process.

EXAMPLE 1

To demonstrate the improvement of the present invention, a catalytic dehydrogenation process was operated to dehydrogenate normal paraffin hydrocarbons having a carbon number range of about $C_{12}$ to about $C_{13}$ into normal olefin hydrocarbons. In a first run of this experiment, a first fresh dehydrogenation catalyst was employed to dehydrogenate the normal paraffin charge stock. Such first dehydrogenation catalyst was utilized without any pretreatment to improve the selectivity of such catalyst for the conversion of normal paraffin hydrocarbons into normal olefin hydrocarbons. In a second run of this experiment, a second dehydrogenation catalyst, selected from the same catalyst batch as the first dehydrogenation catalyst, was pretreated according to the method of the present invention prior to utilizing said second catalyst in the dehydrogenation process. By comparing the selectivity of the first dehydrogenation catalyst and the second dehydrogenation catalyst for the conversion of normal paraffin hydrocarbons into normal olefin hydrocarbons, the advantage of the treating method of the present invention may be seen. The treated, second dehydrogenation catalyst has a substantially improved selectivity for the conversion of normal paraffin hydrocarbons into normal olefin hydrocarbons during the early periods of a catalytic paraffin dehydrogenation process.

The catalyst employed for both the first run and the second run of the present example was selected from a fresh batch of catalyst comprising about 0.73% platinum metal deposited upon a synthetic crystalline silica-alumina zeolitic molecular sieve base, having uniform pore openings in the range of about 10 angstrom units. Such catalyst was extruded into cylindrical pellets having dimensions of about $\frac{1}{16}$ inches diameter by about $\frac{1}{4}$–$\frac{1}{2}$ inches length.

In the first run of this experiment, about 100 cc. of the fresh, untreated, dehydrogenation catalyst was loaded into a small reactor having a volume of about 100 cc., such reactor being equipped with an inlet means and an outlet means. This first loading of dehydrogenation catalyst was employed in a normal paraffin dehydrogenation process by flowing about 400 cc. per hour of normal paraffin hydrocarbon comprising $C_{12}$ to $C_{13}$ hydrocarbons through said first catalyst at a temperature of about 911° F., a pressure of about 50 p.s.i.g., in the presence of molecular hydrogen at a molar ratio of hydrogen to hydrocarbon of about 7.7:1. The liquid hourly space velocity of normal paraffin hydrocarbon contacting said first catalyst loading was about 4 volumes of oil per hour per volume of catalyst. Effluent from the reaction zone, comprising hydrogen, unreacted normal paraffin hydrocarbon and converted normal paraffin hydrocarbons was cooled to partially condense such effluent at a temperature of about 40° F. and a pressure of about 50 p.s.i.g. Liquid condensate from the cooling step was accumulated for 12 hours. At the end of such time, composite samples of the accumulated liquid product were analyzed to determine the conversion activity of the first dehydrogenation catalyst and the selectivity of such catalyst for the production of normal olefin hydrocarbons from the normal paraffin hydrocarbon charge stock. The results of such analyses were that 24.8 weight percent of the normal paraffin hydrocarbons were converted and the olefin content of the liquid reaction product was 13.7 volumes percent. However, the selectivity of the catalyst for the conversion of normal paraffin hydrocarbons into normal olefin hydrocarbons was only 34.9 mole percent, wherein selectivity is expressed by the following formula:

$$\text{Selectivity} = \frac{\text{moles n-olefin in product}}{\text{moles n-paraffins disappearing}} (100)$$

In a second run to demonstrate the effectiveness of treating the catalyst according to the method of the present invention, the reactor employed in the first run was emptied and cleaned and 100 cc. of fresh catalyst, selected from the same catalyst batch as the first dehydrogenation catalyst, was loaded into said reactor. This second dehydrogenation catalyst was treated according to the method of the present invention by contacting said catalyst with the $C_{12}$-$C_{13}$ normal paraffin hydrocarbon charge stock and molecular hydrogen in a hydrogen-hydrocarbon mole ratio of 7.7:1 at a temperature of 911° F., and a pressure of 50 p.s.i.g., for a period of 12 hours during which time a minimum flow, in the range of about 40 cc. per hour of paraffin hydrocarbon charge stock, was maintained through the second dehydrogenation catalyst to ensure contact of said hydrocarbon with said catalyst. At the end of the 12 hour treating period a second paraffin hydrocarbon dehydrogenation run was begun. Paraffin hydrocarbon having a carbon number range of $C_{12}$ to $C_{13}$, at a rate of about 400 cc. per hour and hydrogen gas at a rate of about 14 s.c.f. per hour to provide a hydrogen to hydrocarbon molar ratio of about 7.7:1, at a temperature of about 911° F. and a pressure of about 50 p.s.i.g. were contacted with the treated second dehydrogenation catalyst to convert said paraffin hydrocarbon into olefin hydrocarbon. Thus, the liquid hourly space velocity of $C_{12}$-$C_{13}$ normal paraffin hydrocarbon in contact with the second hydrogenation catalyst was 4 volumes of oil per hour per volume of catalyst. The operating conditions, flow rates, and space velocity in this second dehydrogenation run were the same as those employed in the first dehydrogenation run, such that a comparison between the conversion selectivity and porduct yields of the two runs may be made. The second dehydrogenation run was operated for a period of 12 hours during which time effluent from the reaction zone was cooled to a temperature of about 40° F. to partially condense said effluent and the condensate, portion of said effluent comprising unreacted paraffin hydrocarbon, olefin hydrocarbon, and other conversion products was accumulated for the 12 hour period. At the end of the 12 hour operating period, composite samples of the accumulated condensate were analyzed to determine the conversion of normal paraffin hydrocarbon and the selectivity of such conversion for the production of normal olefin hydrocarbons. The results of such analyses were that 19.8 weight percent of the normal paraffin hydrocarbon charge was converted in the second dehydrogenation run and 14.7 volume percent of the condensate from the second dehydrogenation run was olefin hydrocarbon. From these results, the selectivity of the treated second dehydrogenation catalyst was calculated to be 64.6 mole percent to normal olefin hydrocarbons.

Comparing the results obtained in the first dehydrogenation run, wherein an untreated dehydrogenation catalyst was employed, and the results of the second dehydrogenation run, wherein a catalyst treated according to the method of the present invention was employed, the advantage of the treating method of the present invention may be clearly seen. For instance, conversion of normal paraffin hydrocarbon in the second run was 19.8 weight percent of the total paraffin charge as compared to 24.8 weight percent of the paraffin charge converted in the first dehydrogenation run. However, olefins comprise 14.7 volume percent of the liquid fraction recovered in the second dehydrogenation run and only 13.7 volume percent of the liquid fraction recovered from the first dehydrogenation reaction run. Of most importance is a comparison of the selectivity of the catalyst employed in the two runs for the conversion of normal paraffin hydrocarbon into normal olefin hydrocarbon. The selectivity for the treated catalyst in the second dehydrogenation run was 64.6 mole percent of converted normal paraffins into normal olefin hydrocarbons while the selectivity of the untreated catalyst in the first dehydrogenation run was only 34.9 mole percent of the converted normal paraffin hydrocarbon into normal olefin hydrocarbon. From this comparison, it can be clearly seen that a substantially greater proportion of the converted normal paraffin hydrocarbon was recovered as normal olefin hydrocarbons in the second dehydrogenation run.

The foregoing discloses a method for treating a dehydrogenation catalyst such that the selectivity of said treated catalyst for the conversion of normal paraffin hydrocarbons into normal olefin hydrocarbons is substantially improved. Also, an improved process for dehydrogenating normal paraffin hydrocarbon into normal olefin hydrocarbon, employing the treating method of the present invention is disclosed. Many modifications and variations of the improvements of the present invention will be obvious to those skilled in the art which are within the spirit and scope of the present invention. Therefore, no limitation to the present invention is intended except the limitations included within the spirit and scope of the appended claims.

We claim:

1. In a dehydrogenation process wherein a normal paraffin hydrocarbon is dehydrogenated at an elevated temperature in the presence of molecular hydrogen employing a dehydrogenation catalyst to yield normal olefin hydrocarbon; the improvement for increasing the yield of normal olefin hydrocarbons from converted normal paraffin hydrocarbon which comprises:

treating the dehydrogenation catalyst, prior to use in the dehydrogenation reaction, with normal paraffin hydrocarbon and hydrogen in a mole ratio of hydrogen to hydrocarbon of from about 0.5:1 to about 40:1, at a temperature of from about 750° F., to about 1000° F., a pressure of about atmospheric to about 50 p.s.i.g. for a period of from about 12 to about 24 hours.

2. The method of Claim 1 wherein the dehydrogenation catalyst comprises a dehydrogenation component selected from the group consisting of platinum, palladium, ruthenium, rhodium, rhenium, and mixtures thereof, and a refractory metal oxide base selected from the group consisting of alumina, silica-alumina, silica-zirconia, silica-boria, silica-magnesia, mixtures thereof, and crystalline silica-alumina zeolitic molecular sieves having uniform pore openings of from about 3 to about 10 angstroms, and mixtures thereof.

3. The method of Claim 2 wherein the dehydrogenation catalyst comprises about 0.05 to about 2 weight percent platinum supported upon a synthetic crystalline silica-alumina zeolitic molecular sieve having uniform pore openings of from about 3 angstroms to about 10 angstroms.

4. The method of Claim 2 wherein flow of normal paraffin hydrocarbon and hydrogen are maintained through the dehydrogenation catalyst during the treating step at a rate of from about 0.01 to about 0.4 volumes of oil per volume of catalyst per hour, sufficient to maintain contact of normal paraffin hydrocarbon with the dehydrogenation catalyst.

5. A continuous process for the conversion of normal paraffin hydrocarbon into normal olefin hydrocarbon wherein a plurality of reaction zones each containing dehydrogenation catalyst are employed, wherein at least one reaction zone is in dehydrogenation service, and wherein dehydrogenation catalyst contained in an off-stream dehydrogenation zone is treated to improve the selectivity of said catalyst for the conversion of normal paraffin hydrocarbon into normal olefin hydrocarbon, which process comprises:

(A) heating a mixture of normal paraffin hydrocarbon and molecular hydrogen in a molar ratio of hydrogen to hydrocarbon of from about 2:1 to about 15:1 to a temperature of from about 860° F. to about 930° F.;

(B) reacting a major portion of said normal paraffin hydrocarbon-hydrogen mixture, in a first dehydrogenation zone, at a temperature of from about 860°

F., to about 930° F. at a pressure of from about 15 p.s.i.g. to about 50 p.s.i.g., and at a liquid hourly space velocity of from about 2 to about 10 volumes of oil per hour per volume of catalyst in the presence of a first dehydrogenation catalyst to convert a portion of said normal paraffin hydrocarbon into olefin hydrocarbon;

(C) cooling effluent from said first dehydrogenation zone to a temperature from about 40° F. to about 100° F. at a pressure of from about 15 p.s.i.g. to about 50 p.s.i.g., to partially condense said first reaction zone effluent into a condensate fraction and a gas fraction;

(D) circulating a portion of said gas fraction comprising hydrogen for combination with additional normal paraffin hydrocarbons for charge to the process;

(E) recovering said condensate fraction comprising unconverted normal paraffin hydrocarbon, normal olefin hydrocarbon, and other conversion products for separation of the desired normal olefin product;

(F) treating a fresh or freshly regenerated dehydrogenation catalyst, contained in a second dehydrogenation zone, with a minor portion of said hot normal paraffin-hydrogen mixture at a temperature of from about 860° F. to about 930° F., a pressure of from about 15 to about 50 p.s.i.g., at a liquid hourly space velocity of from about 0.01 to about 0.4 volumes of oil per hour per volume of catalyst for a period of from about 12 to about 24 hours to substantially improve the selectivity of said fresh or freshly regenerated dehydrogenation catalyst for conversion of normal paraffin hydrocarbons into olefin hydrocarbons.

6. The method of Claim 5 wherein at the end of the treating step for the fresh or freshly regenerated catalyst the dehydrogenation zone containing said treated dehydrogenation catalyst is purged with a gas fraction from the dehydrogenation reaction effluent to remove hydrocarbon from contact with said treated dehydrogenation catalyst; and wherein effluent from said purge step is recirculated for combination with the normal paraffin-hydrogen mixture being charged to the process.

7. The method of Claim 6 wherein effluent from the fresh or freshly regenerated dehydrogenation catalyst treating step is recirculated for combination with normal paraffin-hydrogen mixture process charge.

8. The method of Claim 7 wherein the condensate fraction is separated, in an olefin recovery zone, into an olefin fraction and an unconverted paraffin fraction, and wherein the unconverted paraffin fraction is recycled to the dehydrogenation reaction for conversion into additional olefin hydrocarbon.

9. In a dehydrogenation process wherein normal paraffin hydrocarbon in the $C_6$–$C_{24}$ carbon number range is dehydrogenated to yield normal olefin hydrocarbons at an elevated temperature in the presence of molecular hydrogen employing a dehydrogenation catalyst comprising a dehydrogenation component selected from the group consisting of platinum, palladium, ruthenium, rhodium, rhenium, and mixtures thereof and a catalyst support selected from the group consisting of alumina, silica-alumina, silica-zirconia, silica-boria, silica-magnesia, crystalline silica-alumina zeolitic molecular sieves having uniform pore openings of from about 3 to about 10 angstroms, and mixtures thereof; the improvement for increasing the yield of normal olefin hydrocarbons from converted normal paraffin hydrocarbon which comprises: treating the dehydrogenation catalyst, prior to use in the dehydrogenation reaction, with normal paraffin hydrocarbon and hydrogen in a mole ratio of hydrogen to hydrocarbon of from about 0.5:1 to about 40:1 at a temperature of from about 750° F. to about 1,000° F., a pressure of about atmospheric to about 50 p.s.i.g. and at a liquid hourly space velocity of from about 0.01 to about 0.4 volumes normal paraffin/hour/volume of catalyst, sufficient to maintain contact of normal paraffin hydrocarbon with the dehydrogenation catalyst for a period of from about 12 to about 24 hours.

References Cited

UNITED STATES PATENTS

| | | | |
|---|---|---|---|
| 3,662,018 | 5/1972 | Parker et al. | 260—683.3 |
| 3,458,592 | 7/1969 | Senn et al. | 252—455 Z |
| 3,458,593 | 7/1969 | Senn et al. | 260—683.3 |
| 3,433,851 | 3/1969 | Keblys | 260—683.3 |
| 3,424,671 | 1/1969 | Kay | 260—683.3 |
| 3,507,779 | 4/1970 | Baillie et al. | 208—119 |
| 3,775,501 | 11/1973 | Kaeding | 260—673 |

DELBERT E. GANTZ, Primary Examiner

J. M. NELSON, Assistant Examiner

U.S. Cl. X.R.

252—411